(12) United States Patent
Shirakata et al.

(10) Patent No.: US 7,635,938 B1
(45) Date of Patent: Dec. 22, 2009

(54) VEHICULAR ROTARY ELECTRIC MACHINE

(75) Inventors: Yuji Shirakata, Chiyoda-ku (JP);
Masao Kikuchi, Chiyoda-ku (JP);
Naohide Maeda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/255,784

(22) Filed: Oct. 22, 2008

(30) Foreign Application Priority Data

Jun. 10, 2008 (JP) .............................. 2008-151730

(51) Int. Cl.
*H02K 13/00* (2006.01)
(52) U.S. Cl. ..................................... 310/239
(58) Field of Classification Search ................. 310/239, 310/240, 241, 242
See application file for complete search history.

(56) References Cited

U.S. PATENT DOCUMENTS 7,211,911 B2 * 5/2007 Tsuge ........................... 310/51
2002/0047472 A1 * 4/2002 Yamada et al. ............... 310/239

FOREIGN PATENT DOCUMENTS

JP        2008-005676 A       1/2008

* cited by examiner

*Primary Examiner*—Nguyen N Hanh
(74) *Attorney, Agent, or Firm*—Sughrue Mion, PLLC (57) ABSTRACT

A vehicular rotary electric machine has a stator and a rotor supported by a bracket; a field winding which is provided on the rotor and is for generating a magnetomotive force; a field circuit section which is for supplying a current to the field winding; and a brush holder having a brush, the field circuit section and the brush holder being separately mounted to the bracket. In the vehicular rotary electric machine, connecting means between the field circuit section and the brush holder is configured by an intermediate wiring member having a stress buffering mechanism.

5 Claims, 8 Drawing Sheets

VEHICULAR ROTARY ELECTRIC MACHINE

BACKGROUND OF THE INVENTION

1. Field of the Invention

The present invention relates to a field winding type rotary electric machine mounted with a field circuit section which supplies a field current to a field winding of a rotor and, more particularly, relates to a vehicular rotary electric machine to be mounted in an automobile.

2. Description of the Related Art

In Japanese Unexamined Patent Publication No. 2008-5676, a hitherto known structure of a field winding type vehicular rotary electric machine is shown. In the field winding type vehicular rotary electric machine shown in Japanese Unexamined Patent Publication No. 2008-5676, a magnetomotive force is produced by supplying a current to a field winding provided on a rotor and generation of electricity is performed; and a current adjusted by a field circuit section is supplied from a brush incorporated in a brush holder to the field winding through a slip ring provided in the rotor. There is described a configuration in which the field circuit section and the brush holder are separately mounted to a bracket and connecting terminals integrated with the field circuit section are connected to the brush holder.

The field circuit section is required to cool switching elements which are for controlling the current; and therefore, the field circuit section is mounted at a place being in contact with ambient air on the outside of the rotary electric machine. On the other hand, the brush is mounted in the vicinity of the center portion of the rotary electric machine in order to bring into contact with the rotor. For this reason, the field circuit section and the brush holder are mounted to the rotary electric machine as separate components.

In the meantime, in a vehicular rotary electric machine or the like particularly to be mounted in an automobile, vibration resistance of the rotary electric machine is required because vibration during running is large; and generally, in the vehicular rotary electric machine, consideration to vibration resistance is included.

On the other hand, durability of the vehicular rotary electric machine has been more strictly required, and vibration durability performance has been required more than ever before. More particularly, terminals for electrically connecting are provided in the field circuit section and the brush holder which are mounted to the vehicular rotary electric machine, and the field circuit section and the brush holder separately vibrate; and therefore, a load applied to a terminal connecting portion is increased.

BRIEF SUMMARY OF THE INVENTION

The present invention has been made to solve the foregoing problems, and an object of the present invention is to provide a vehicular rotary electric machine in which a connecting portion between a field circuit section and a brush holder is configured by an intermediate wiring member in which connecting terminals are separately formed from the field circuit section and a stress buffering mechanism is provided in the intermediate wiring member, whereby vibration applied to the connecting portion is absorbed and vibration resistance is improved.

A vehicular rotary electric machine according to the present invention has a bracket; a stator and a rotor which are supported by a bracket; a power transmission portion provided in front; a field winding which is provided on the rotor and is for generating a magnetomotive force; a field circuit section which is for supplying a current to the field winding; and a brush holder having a brush, the field circuit section and the brush holder being separately mounted to the bracket. The vehicular rotary electric machine has connecting means between the field circuit section and the brush holder, the connecting means being configured by an intermediate wiring member having a stress buffering mechanism.

According to a vehicular rotary electric machine of the present invention, an intermediate wiring member which connects a field circuit section to a brush holder, the field circuit section and the brush holder being separately mounted to a bracket, and absorbs residual stress due to each positional deviation of the field circuit section and the brush holder, whereby vibration resistance can be improved.

The foregoing and other object, features, and advantages of the present invention will become more apparent from the following detailed description of the preferred embodiments and description shown in drawings.

DETAILED DESCRIPTION OF THE INVENTION

Preferred Embodiment 1

A preferred embodiment of a vehicular rotary electric machine according to the present invention will be described in detail with reference to the accompanying drawings.

Figure 1:
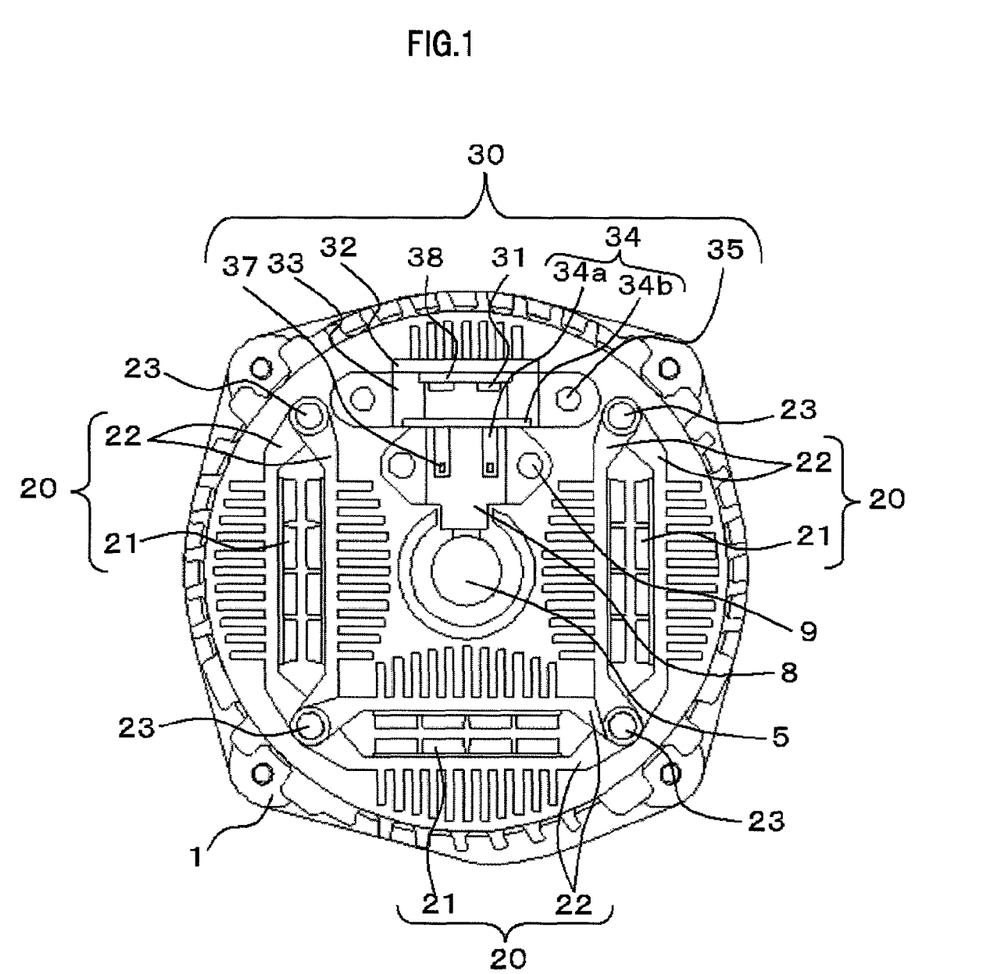
FIG. 1 is a top view from the rear showing a vehicular rotary electric machine of a preferred embodiment 1 according to the present invention.
Figure 2:
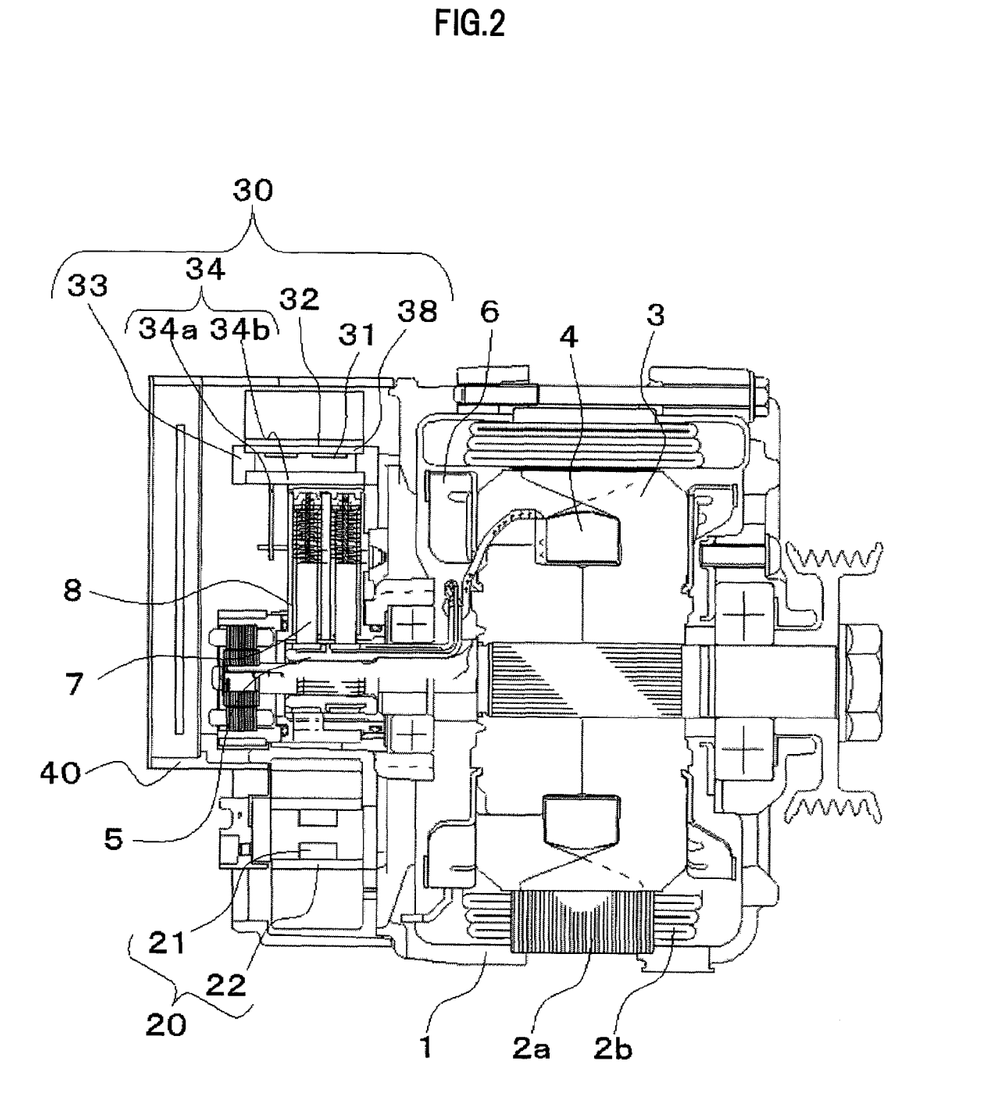
FIG. 2 is a cross-sectional view from the side showing the vehicular rotary electric machine of the preferred embodiment 1 according to the present invention.
Figure 3:
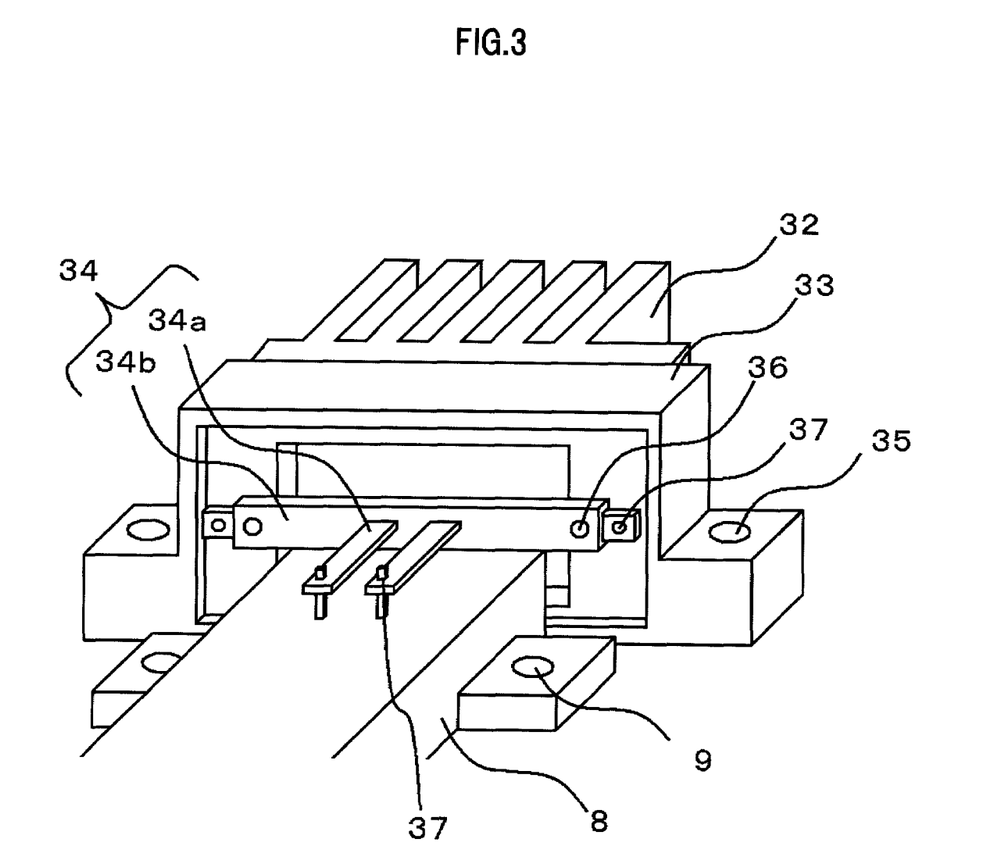
FIG. 3 is a perspective view showing a field circuit section and a brush holder portion of the vehicular rotary electric machine in the preferred embodiment 1 according to the present invention.

FIGS. 1 to 3 are views each showing a preferred embodiment 1 of the vehicular rotary electric machine according to the present invention; FIG. 1 is a top view from the rear of the vehicular rotary electric machine; FIG. 2 is a cross-sectional of the side thereof; and FIG. 3 is a perspective view showing a field circuit section and a brush holder portion. In FIGS. 1 to 3, the vehicular rotary electric machine of the preferred embodiment 1 has a stator 2a and a rotor 3 supported by a bracket 1; and the rotor 3 has a field winding 4 which is for generating a magnetomotive force, a slip ring 5, and a cooling fan 6. A power transmission portion is provided in front of the bracket 1; on the backward side thereof, a brush holder 8 having a brush 7 which comes in contact with the slip ring 5, a power circuit section 20 which is for supplying an alternating current electric power to a stator winding 2b, and a field circuit section 30 which is for supplying a current to the field winding 4 are separately mounted; and a case 40 is disposed in a rotational axis direction on the backward side of the power circuit section 20 and the field circuit section 30. In the vehicular rotary electric machine, the field circuit section 30 and the brush holder 8 need to be separately mounted to the bracket 1, respectively.

The power circuit section 20 is configured by mounting semiconductor switching elements for the power circuit 21, which is for supplying a current to the armature winding 2b, to a heat sink for cooling the power circuit 22.

The field circuit section 30 is configured by jointing a metal substrate 38 to a heat sink for cooling field system 32 and a resin case 33, the metal substrate 38 being mounted with semiconductor switching elements for field system 31 and a control integrated circuit (IC) (not shown in the drawings) which are for supplying a current to the field winding 4.

Fins of the heat sink for cooling field system 32 are extended in a reverse direction to a direction where there is a rotational axis; and a stress buffering mechanism which is for absorbing vibration is provided as connecting means which is for energizing a current from the semiconductor switching elements for field system 31 to the brush 7, as to be described later. There is provided an intermediate wiring member 34 which is disposed on the long-side side that is on the rotational axis side of the field circuit section 30, and electrically connects the semiconductor switching elements for field system 31 to the brush 7. The intermediate wiring member 34 is protruded from one face of the field circuit section 30 toward the rotational axis direction, and an extending direction thereof is a normal direction of a protruding face.

Figure 4:
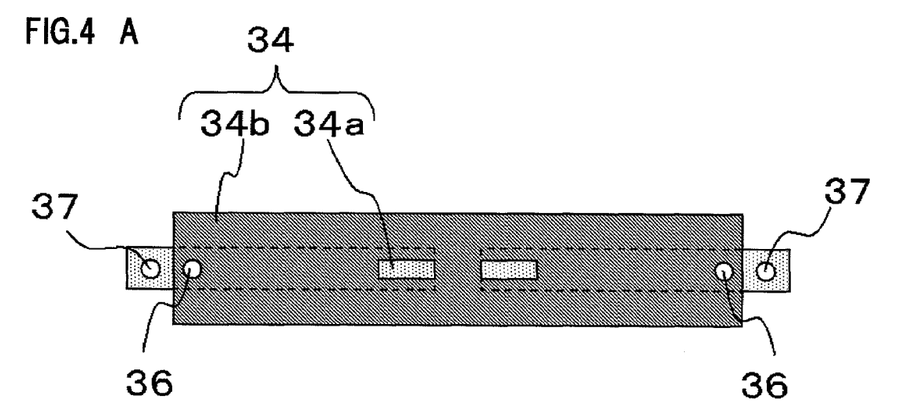
FIGS. 4A and 4B are views each showing an intermediate wiring member of the vehicular rotary electric machine in the preferred embodiment 1 according to the present invention.

The intermediate wiring member 34 is one which connects the field circuit section 30 to terminals of the brush holder 8, and is composed of metal wiring materials 34a and a planar face portion 34b disposed in a right angle direction to the planar face portions 34b. The planar face portion 34b is formed using resin which is an elastic body; and as shown in FIGS. 4A and 4B, the intermediate wiring member 34 is configured by integrating the metal wiring materials 34a in the planar face portion 34b by insert molding. In addition, in FIGS. 4A and 4B, there is shown the intermediate wiring member 34 in which two metal wiring materials 34a are integrated with one resin planar face portion 34b; however, two metal wiring materials 34a are not integrated with one planar face portion 34b, but, there may be intermediate wiring members 34 in which two metal wiring materials 34a are integrated with separate planar face portions 34b, respectively.

As shown in FIG. 1, at least either one of the field circuit section 30 and the brush holder 8 is mounted to the bracket 1 with screws at two positions disposed in parallel to the planar face portion 34b of the intermediate wiring member 34, the two positions being fixing portions 35 mounted to the resin case 33 and being brush holder fixing portions 9 mounted to the brush holder 8.

The stress buffering mechanism is a mechanism which absorbs stress by the intermediate wiring member 34 which connects between the field circuit section 30 and the brush holder 8. In the case where vibration is applied to the vehicular rotary electric machine, the field circuit section 30 and the brush holder 8 separately vibrate; and therefore, a large load is applied to connecting portions 37 between the field circuit section 30 and the brush holder 8. Consequently, in the preferred embodiment 1, in the case where stress is applied to the metal wiring materials 34a and the planar face portion 34b using resin that is an elastic material for use in the intermediate wiring member 34, the planar face portion 34b receives the stress by its face; and therefore, the stress can be dispersed. Further, since the planar face portion 34b is the elastic body, when the stress is applied, the planar face portion 34b absorbs the stress by deflecting in a positive manner; and consequently, the stress applied to the connecting portion 37 can be absorbed. Furthermore, this is not limited to the case where the vibration is generated, but residual stress can also be absorbed, the residual stress being generated among the field circuit section 30, the brush holder 8, and the intermediate wiring member 34 due to positional deviation of components when the vehicular rotary electric machine is assembled.

Figure 5:
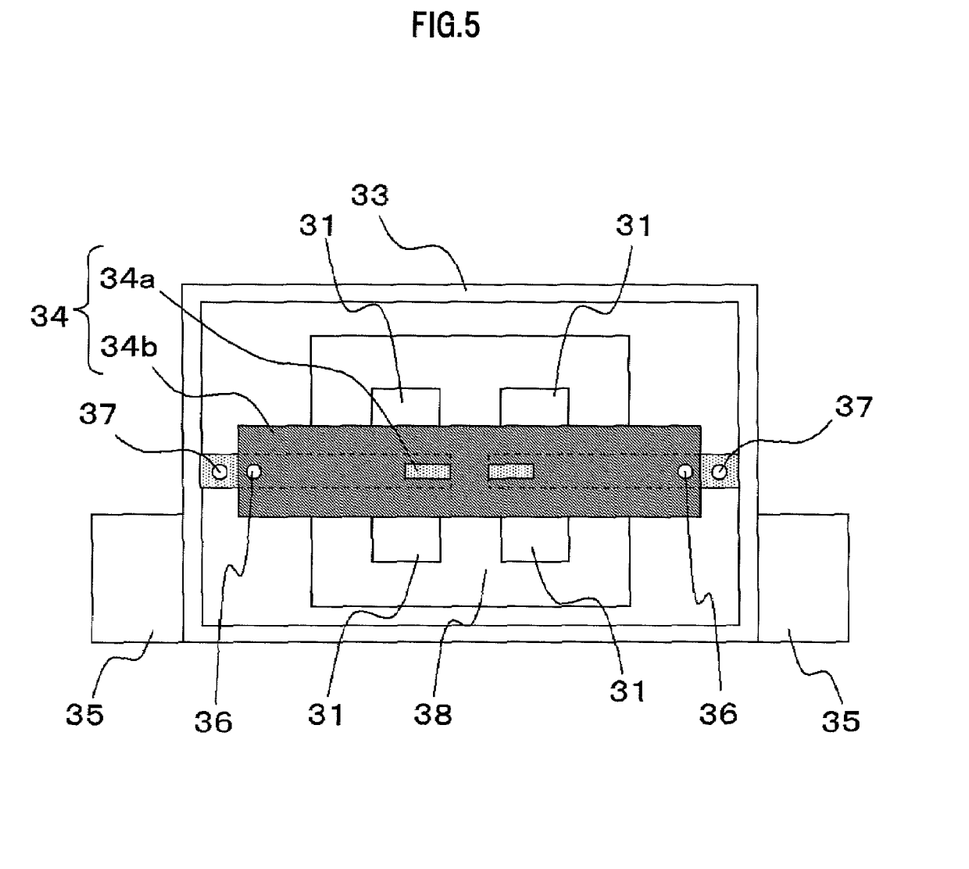
FIG. 5 is a top view showing the field circuit section of the vehicular rotary electric machine in the preferred embodiment 1 according to the present invention.

The intermediate wiring member 34 is screwed to the connecting portions 37 of the field circuit section 30 as shown in FIG. 5; and the metal wiring materials 34a and the planar face portion 34b are fixed to the resin case 33 by intermediate wiring member fixing portions 36, in addition to the connecting portions 37.

In a vehicular rotary electric machine mounted in an idling stop vehicle, a hybrid automobile, or the like, when vibration is applied to the entire vehicular rotary electric machine at a time of starting and due to running or the like, the field circuit section 30 and the brush holder 8 separately mounted to the bracket 1 vibrate individually; and therefore, a large load is applied to the connecting portions 37 between the field circuit section 30 and the brush holder 8. However, in the vehicular rotary electric machine of the embodiment 1, such load is absorbed by the stress buffering mechanism provided in the intermediate wiring member 34. That is, the planar face portion 34b disposed in a right angle direction to the metal wiring materials 34a absorbs displacement by deflecting in a positive manner; and therefore, stress applied to the connecting portions 37 can be reduced and vibration resistance can be improved.

Since the vibration applied to the field circuit section 30 is in a normal direction of the planar face portion 34b of the intermediate wiring member 34, vibration applied in a direction perpendicular to the fixing portion 35 to the bracket 1 is absorbed by the stress buffering mechanism of the intermediate wiring member 34, and vibration applied in a direction parallel to the fixing portion 35 is received by the fixing portion 35 to the bracket 1; and accordingly, this leads to improvement in vibration resistance. Sufficient vibration resistance is provided because the field circuit section 30 and the brush holder 8 are provided with two fixing positions respectively; and therefore, it becomes possible to reduce the number of fixing components and to reduce a fixing area.

Furthermore, as shown in FIG. 5, the field circuit section 30 and the intermediate wiring member 34 are fixed to the resin case 33 with screws by not only the connecting portions 37 but also by the intermediate wiring member fixing portions 36; and accordingly, stress can be received by the intermediate wiring member fixing portions 36, the stress applied to the connecting portions 37 can be absorbed, and vibration resistance can be improved.

As described above, according to the preferred embodiment 1 of the present invention, connection between the field circuit section 30 and the brush holder 8 is performed using the intermediate wiring member 34 and the stress buffering mechanism is provided in the intermediate wiring member 34. Accordingly, stress applied to the connecting portions 37 between the field circuit section 30 and the brush holder 8 is absorbed by the stress buffering mechanism, the stress being generated in the case where vibration is applied to the vehicular rotary electric machine at a time of starting and due to running or the like; and vibration resistance of the connecting portion between the field circuit section 30 and the brush holder 8 can be improved. Further, mounting positions to the bracket 1 of the field circuit section 30 and the brush holder 8 are respectively fixed at two positions of the fixing portions 35 and the brush holder fixing portions 9 to the bracket 1, the fixing portions 35 and the brush holder fixing portions 9 being disposed parallel to the planar face portion 34b of the intermediate wiring member 34; and accordingly, it becomes possible to reduce stress in a direction parallel to the mounting positions in the case where vibration is applied, to improve vibration resistance, to reduce the number of fixing components, and to reduce a fixing area.

Preferred Embodiment 2

Figure 6:
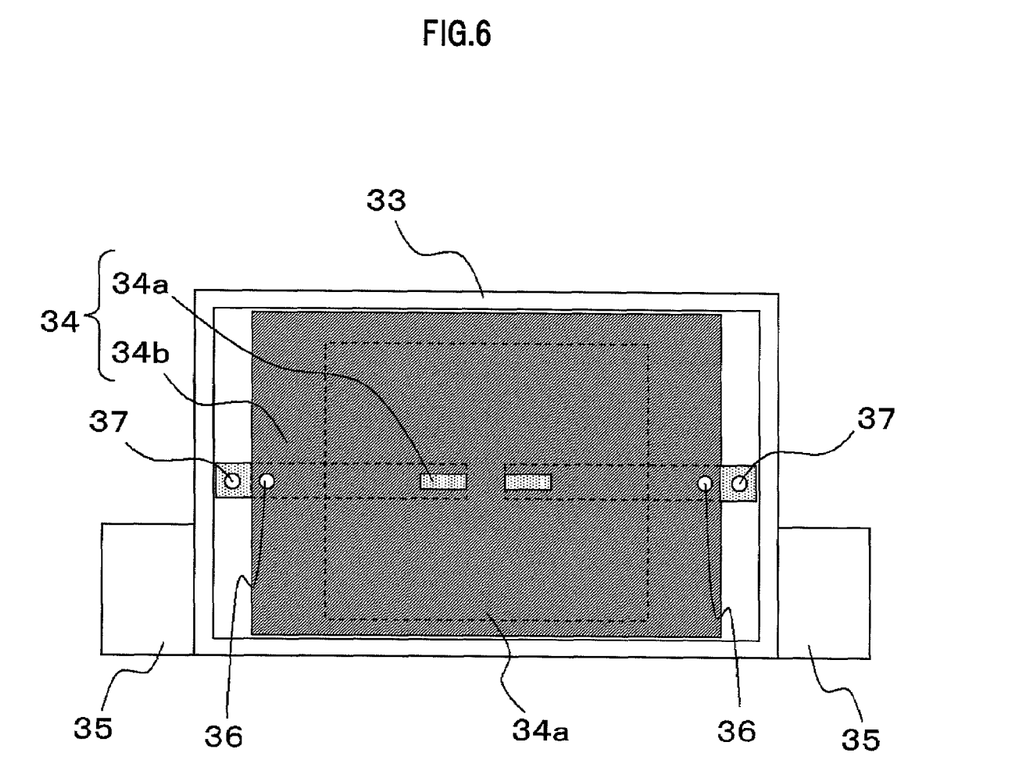
FIG. 6 is a top view showing a field circuit section of a vehicular rotary electric machine in a preferred embodiment 2 according to the present invention.

FIG. 6 is a top view showing a field circuit section of a vehicular rotary electric machine according to a preferred embodiment 2 of the present invention. In addition, referring to the drawings, the same reference numerals as those shown in the preferred embodiment 1 represent the same or corresponding elements.

The intermediate wiring member 34 of the preferred embodiment 1 has a shape which covers a part of the entire mounting face with respect to the field circuit section 30; however, in the preferred embodiment 2, the shape of a planar face portion 34b is changed to an intermediate wiring member 34 which seems to cover the entire field circuit section as shown in FIG. 6.

A field circuit section 30 is configured by jointing a metal substrate 38 to a heat sink for cooling field system 32, the metal substrate 38 being mounted with semiconductor switching elements for field system 31 and a control IC (not shown in the drawing) which are for supplying a current to a field winding 4, and the semiconductor switching elements for field system 31 being encapsulated in the intermediate wiring member 34, a resin case 33, and the heat sink for cooling field system 32.

In the case of a vehicular rotary electric machine mounted in an automobile, the vehicular rotary electric machine is disposed in an engine room and dust and foreign particles are entered into the vehicular rotary electric machine in addition to vibration during running; and therefore, there is a possibility to enter the dust and foreign particles into the field circuit section. Consequently, the metal wiring material 34a for use in the intermediate wiring member 34 is integrated with the resin planar face portion 34b and the shape of the planar face portion 34b is adjusted to the field circuit section 30 as shown in FIG. 6; and accordingly, the planar face portion 34b becomes a cover of the field circuit section 30, and it becomes possible to prevent foreign particles from outside from entering and to prevent failure and pattern short-circuit of the switching elements 31 and the control IC which are disposed inside thereof.

As described above, according to the preferred embodiment 2 of the present invention, the shape of the planar face portion 34b of the intermediate wiring member 34 is changed and the role of the cover for the field circuit section 30 is fulfilled: and accordingly, even in the case where dust and foreign particles are entered into the vehicular rotary electric machine, it becomes possible to prevent foreign particles from entering into the field circuit section 30 and to prevent failure and pattern short-circuit.

Preferred Embodiment 3

Figure 7:
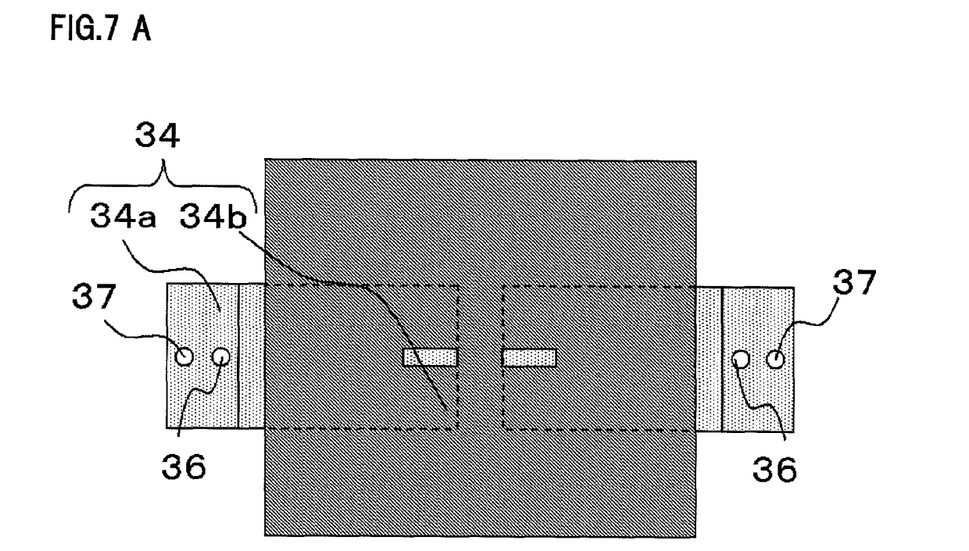
FIGS. 7A and 7B are views each showing an intermediate wiring member of a vehicular rotary electric machine in a preferred embodiment 3 according to the present invention.
Figure 8:
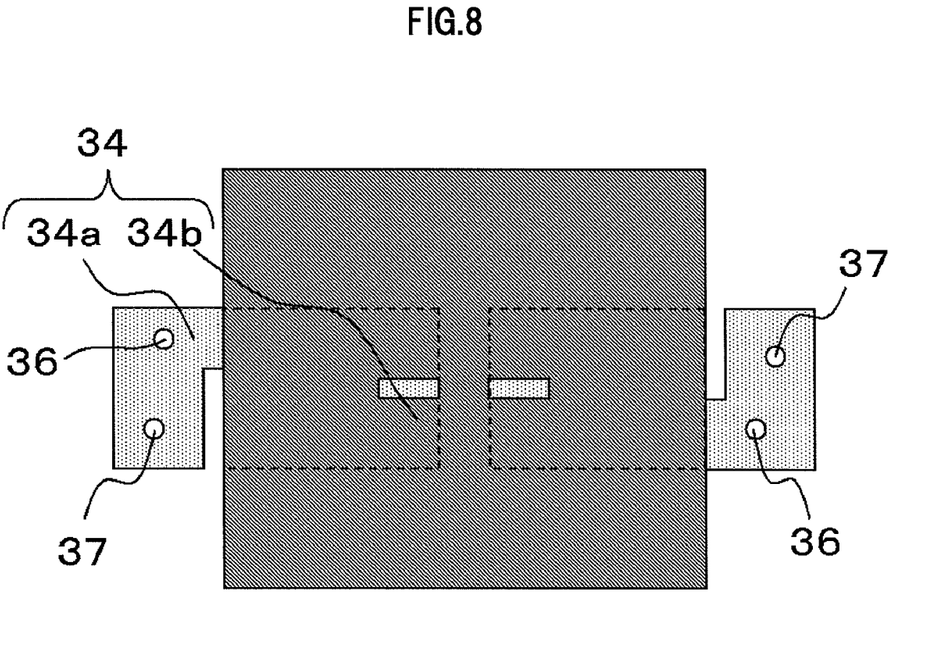
FIG. 8 is a view showing an intermediate wiring member of the vehicular rotary electric machine in the preferred embodiment 3 according to the present invention.

FIGS. 7A, 7B, and 8 are views each showing an intermediate wiring member of a vehicular rotary electric machine according to a preferred embodiment 3 of the present invention. In addition, referring to the drawings, the same reference numerals as those shown in the preferred embodiments 1 and 2 represent the same or corresponding elements.

In the case where a width of the metal wiring material 34a for use in the intermediate wiring member 34 of the preferred embodiments 1 and 2 is enlarged, the percentage of the metal wiring material 34a inserted into the planar face portion 34b increases; and accordingly, the intermediate wiring member 34 becomes difficult to be deflected. However, in the preferred embodiment 3, a stress buffering mechanism is made by providing an elastic region in the metal wiring material 34a.

That is, as shown in FIGS. 7A and 7B, the elastic region, that is, a bent portion is provided by changing the shape in the vicinity of a connecting portion 37 in which the metal wiring material 34a is not covered with a planar face portion 34b. Furthermore, a location where the elastic region is provided in the metal wiring material 34a is a portion which is not covered with the planar face portion 34b; however, there may be integrated with the planar face portion 34b after the elastic region is provided.

Furthermore, as shown in FIG. 8, an elastic region is formed by providing a cutout at a portion where a metal wiring material 34a is not covered with a planar face portion 34b.

As shown in FIGS. 7A and 7B, the shape of the metal wiring material 34a is changed and a spring portion of the elastic region is provided in the metal wiring material 34a; and accordingly, a role which absorbs vibration in a direction perpendicular to the fixing portion 35 with respect to the field circuit section 30 and the bracket 8 is fulfilled. Furthermore, as shown in FIG. 8, the cutout is provided at a connecting portion between the metal wiring material 34a and a resin case 33; and accordingly, the metal wiring material 34b whose width is thinned becomes easy to be deflected and a role which absorbs stress is fulfilled.

This can absorb residual stress generated to connecting portions 37 from positional deviation due to variation in each component in assembling. Furthermore, the stress generated also in the case where vibration is applied can be absorbed, and stress applied to the connecting portions 37 between the field circuit section 30 and the brush holder 8 can be reduced.

In addition, it is possible to be a cover of the field circuit section 30 by changing the shape of the planar face portion 34b as in the preferred embodiment 2.

As described above, according to the preferred embodiment 3 of the present invention, even in the case where the width of the metal wiring material 34a for use in the intermediate wiring member 34 is increased and the planar face portion becomes difficult to be deflected, the role of a stress buffering mechanism can be fulfilled by changing the shape of the metal wiring material 34a which is not covered with the planar face portion 34b and by forming the elastic region.

Various modifications and alternations of this invention will be apparent to those skilled in the art without departing from the scope and spirit of this invention, and it should be understood that this is not limited to the illustrative embodiments set forth herein.

What is claimed is:

1. A vehicular rotary electric machine, comprising:
a bracket;
a stator supported by said bracket;
a rotor supported by said bracket;
a power transmission portion provided in front;
a field winding which is provided on said rotor and is for generating a magnetomotive force;
a field circuit section which is mounted to said bracket and is for supplying a current to said field winding; and
a brush holder having a brush, said brush holder being mounted to said bracket separately from said field circuit section, said vehicular rotary electric machine, comprising:
connecting means between said field circuit section and said brush holder, said connecting means being configured by an intermediate wiring member having a stress buffering mechanism.

2. The vehicular rotary electric machine according to claim 1,
wherein said intermediate wiring member is composed of a resin planar face portion and a metal wiring material parallel to one face which forms said field circuit section,
said metal wiring material protrudes toward a direction of said brush holder in a normal direction of said planar face portion and is connected to a terminal of said brush holder, and
said intermediate wiring member is mounted to a face on the long-side side that in on the brush holder side of said field circuit section.

3. The vehicular rotary electric machine according to claim 2
wherein at least either one of said field circuit section and said brush holder is mounted to said bracket at least two fixing portions and above disposed parallel to said planar face portion of said intermediate wiring member.

4. The vehicular rotary electric machine according to claim 2
wherein said metal wiring material of said intermediate wiring member is provided with an elastic region.

5. The vehicular rotary electric machine according to claim 2
wherein said planar face portion of said intermediate wiring member becomes a cover of a mounting face of said field circuit section.

* * * * *